May 12, 1970 W. E. WOODMANSEE 3,511,086
NONDESTRUCTIVE TESTING WITH LIQUID CRYSTALS
Filed Nov. 23, 1966 2 Sheets-Sheet 1

INVENTOR.
WAYNE E. WOODMANSEE
BY
Sam Laub
AGENT

INVENTOR.
WAYNE E. WOODMANSEE

United States Patent Office 3,511,086
Patented May 12, 1970

3,511,086
NONDESTRUCTIVE TESTING WITH
LIQUID CRYSTALS
Wayne Woodmansee, Seattle, Wash., assignor to The
Boeing Company, Seattle, Wash., a corporation of
Delaware
Filed Nov. 23, 1966, Ser. No. 596,712
Int. Cl. G01n 25/18, 25/72
U.S. Cl. 73—104               3 Claims

ABSTRACT OF THE DISCLOSURE

Method for defining discontinuities in a substrate by applying a layer of cholesteric liquid crystal material in thermally responsive relationship to the substrate and then thermally cycling the substrate to temperature range sufficient to cause selective light scattering by the cholesteric liquid crystal material producing color patterns indicative of the discontinuities in the substrate. The cholesteric liquid crystal material may be incorporated on a plastic film or sandwiched between two or more layers of film, one layer of which may be opaque to increase the visibility of the color patterns. The cholesteric liquid crystal material may also be thermally cycled to its cholesteric-isotropic transition temperature to render permanent indication of discontinuities in the substrate.

---

This invention relates to the observation and recording of temperature distribution patterns on a substrate by liquid cholesteric materials as they are subjected to a variable temperature environment while in contact with a substrate. In greater detail, this invention is concerned with the observation and recording of temperature distribution on heated surfaces which are in thermally sensitive contact with a cholesteric medium which produces a color pattern in response to temperature variations.

An application of the instant invention is in the field of nondestructive testing. Infrared radiometers are presently being used for the majority of thermal nondestructive testing studies due to the ability of these instruments to measure small, rapidly changing surface temperatures associated with material discontinuities without the necessity of establishing surface contact between the radiometer and the part to be tested. Most of these radiometric measurements are made by monitoring a single point or line on the part being inspected. This means that for full coverage of a substantial area, a scanning system must be devised which will systematically move the radiometer focal point over the part to be inspected. These systems frequently become complex, expensive and difficult to use with irregularly shaped components.

Another approach to the measurement of surface temperature for nondestructive testing applications has been the use of temperature indicating paints and phosphors. These mediums undergo various physical changes at a given temperature or over a range of temperatures which result in a change in color or variations in the intensity of emitted light. A typical system for measuring the temperature distribution on the surface of solid bodies utilizing phosphors is set forth in U.S. Pat. No. 2,551,650. It is obvious that these systems have a requirement of a secondary source of ultraviolet radiation in order to produce fluorescence of the medium being employed. In addition, there is a requirement of a dark room or some area where light can be temporarily reduced during testing. It should also be noted that these materials are less sensitive in that they will not respond to temperature gradients as small as those which may readily be seen with liquid crystal media.

Other systems of nondestructive testing which employ various compounds which change color with water of hydration changes will not be discussed in detail because these systems are often irreversible or are very slow in their chemical reactions thus not being sensitive enough for the rapid fluctuations necessary in nondestructive testing.

In light of the above discussion, it is an object of the instant invention to adapt sensitive media, liquid cholesteric derivatives, for nondestructive testing purposes.

It is a further object of the instant invention to have a method of determining discontinuities in substrates through the disposition and thermal cycling of a liquid cholesteric medium so as to produce at least one color change as a result of the thermal cycling.

It is a related object of the instant invention to devise a simple means to insure uniform thermal contact between a cholesteric medium and the substrate to be tested.

It is an associated object of the instant invention to devise a method whereby liquid crystal materials which have irregular and jumbled color patterns through long use and length of time left upon the surface may be rejuvenated to the original intense, sharply distinguishable color patterns.

Other objects and applications of the instant invention will become immediately apparent to those skilled in the art from a reading of the following specification, the appended claims and by reference to the drawings wherein:

Figure 7:
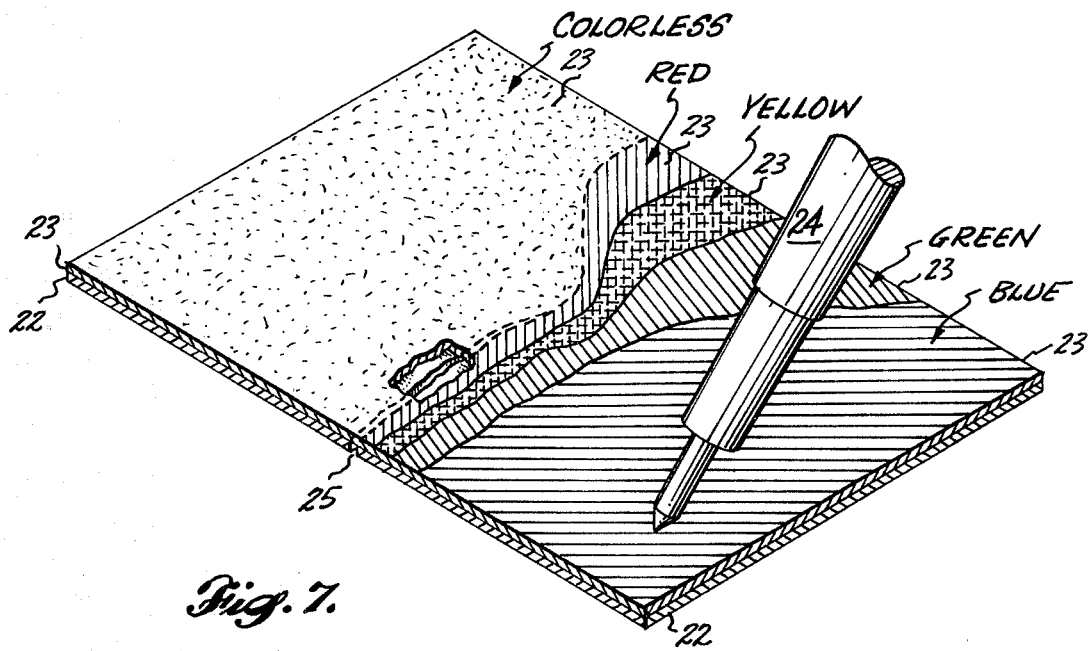

FIG. 7 sets forth a heat test on a clip containing a hidden track.

Liquid crystals, also called mesomorphs, mesophases or mesoforms, are a group of compounds which exhibit, in the liquid state, optical properties normally associated with solids. Another way of describing this behavior has been made by referring to these substances as a state of matter intermediate between solids and isotropic liquids. Although the properties of liquid crystals are not widely known, approximately one out of every 200 organic compounds exhibit liquid crystalline behavior. Mixtures of liquid crystals have been prepared which rapidly and reversibly undergo distinct color changes over variable temperature increments. Variations of the composition of these mixtures make it possible to adjust the temperature at which the color change occurs. Further discussion of the unique properties of the compositions of matter we use in this invention can be gained by reference to application Ser. No. 570,617 filed Aug. 5, 1966, by Wayne Woodmansee, and now Pat. No. 3,441,513, which refers to liquid crystalline compositions of matter of sensitivity sufficient to be used for nondestructive testing purposes, said application being assigned to same assignee as the instant invention.

As described in this copending application, liquid crystals that are suitable for the practice of the instant invention include a three component cholesteric composition having a first basic component providing color sensitivity at a relatively low temperature of cholesteryl oleate; a second component which narrows the temperature response to a small range of temperatures for the occurrence of the color phenomena selected from the group consisting of cholesteryl nonanoate, cholesteryl decanoate, cholesteryl octanoate and cholesteryl paranitrobenzoate; and a third component which adjusts the actual temperature at which the color phenomena occur selected from the group consisting of cholesteryl acetate and cholesteryl propionate.

From this copending application, it is seen that mixtures of liquid crystal materials, principally derivatives of cholesterol, have been prepared which scatter light at different wave lengths depending upon the temperature sensitive properties of the particular derivatives of cholesterol being employed. The temperature range over which the color changes occur is variable depending upon the particular mixture being employed. We have experienced transitions from colorless to red to yellow to green to blue over approximately 1° C. in the range of 20° C. to 60° C. for the materials listed in the above copending application. The temperature transition, which is completely reversible, from red through blue takes less than one second.

The optical properties of cholesteric materials should be emphasized. White light normally incident upon a cholesteric film with a black backing is selectively scattered at various wave lengths depending upon the composition, temperature and angle at which the cholesteric film is viewed. White light normally incident upon a filled cholesteric film (a cholesteric film which has incorporated therein a finely divided dark medium as set forth in the above-mentioned copending application) is selectively scattered at various wave lengths depending upon the composition, temperature and angle at which the film is viewed. The scattering process permits a viewer to determine the temperature of the cholesteric film by observing the colors associated with the wave lengths of the principal scattering. The wave lengths which are not scattered are transmitted in the film and are absorbed by black film underlying the cholesteric materials or by the black powder dispersed in the cholesteric materials. This enhances the intensity of the scattered colors.

The ease with which mixtures of liquid crystals may be used to visualize small thermal gradients makes it possible to use these relatively inexpensive chemicals in many thermal studies that previously required costly and sophisticated instrumentation. In particular, one of the more attractive features of cholesteric materials from the standpoint of nondestructive testing is their ability to reflect light at different wave lengths depending upon the nature of the cholesteric substance, the angle of incident and reflected radiations and the temperature of the material.

Although cholesterol ($C_{27}H_{45}OH$) does not exhibit liquid crystalline properties, the majority of the compounds which ahe known to act as cholesteric liquid crystals are derivatives of cholesterol. Variations in reflective properties of liquid crystal materials can be achieved by varying the composition of the liquid crystal materials as set forth in the above-mentioned copending application. This variation in reflective properties further enhances the use of liquid crystal mediums in nondestructive testing applications because their visualization properties can be varied to suit test conditions.

In light of the foregoing state of the art of liquid crystalline materials, I have found a method for determining discontinuities in a substrate by using liquid crystalline materials in the following manner: (a) disposing on the substrate to be tested for discontinuities at least a cholesteric material capable of showing at least one visual change in color with temperature variation thus achieving a thermally responsive contact with the substrate and (b) thermally cycling the cholesteric material through at least one such color change by heating and cooling of the cholesteric material and the substrate. In the use of the word discontinuity as applied to a substrate, the following are comprehended: a void, fault, flaw or other variation in a homogeneous body; delaminations, differences in thermal conductivity caused by differing properties, voids, or various entrapped gases which cause difference in response of various areas of a substrate; differences in normally linear properties, the absence of thermal insulation in various areas of an insulating substrate and abrupt variation in normally linear functions.

Application of a liquid crystal medium is done in such a manner as to have a thermally responsive contact between the cholesteric medium and the substrate to be tested. Typical applications can be performed by simply painting the materials on the surface or, if the surface is solid, pouring the materials on and spreading them by suitable means.

Figure 1:
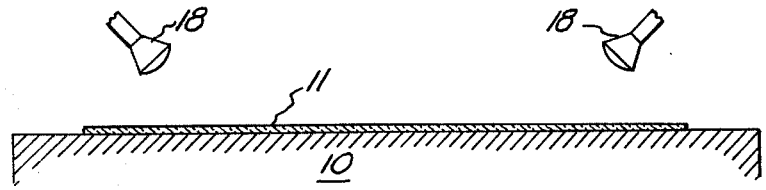
FIG. 1 through FIG. 5 represent various arrangements of surface layers in exaggerated thicknesses in thermal contact with a substrate article to be tested for discontinuities wherein a heat source is used for thermal cycling.

Several typical embodiments of applying at least a cholesteric medium to a substrate are shown in FIGS. 1 through 5. In FIG. 1, a substrate 10 is coated with a filled cholesteric material 11 (a cholesteric medium which has therein a finely divided, dark opaque substance capable of absorbing certain light rays and imparting a visible color to the cholesteric material as temperature changes). Another arrangement possible for FIG. 1 is using an unfilled cholesteric material 11 when the substrate 10 is a dark article which of its own accord will bring out the color patterns of the unfilled cholesteric material 11.

Figure 2:
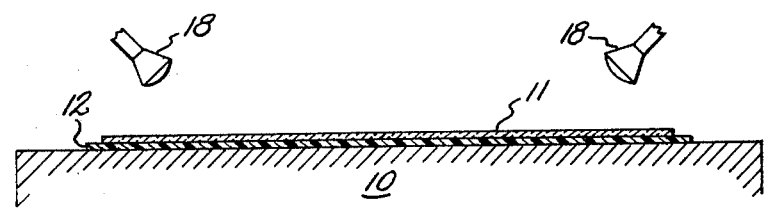
Figure 3:
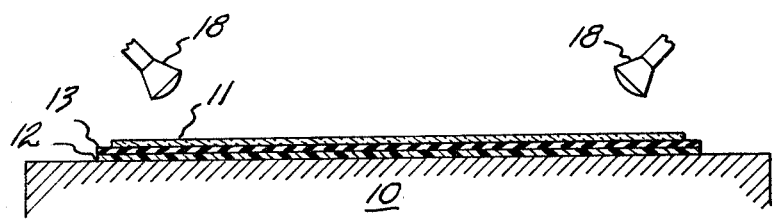

For systems in which it is not desired to directly contact the substrate 10 with the cholesteric media, another configuration shown in FIG. 2 allows a thermally responsive contact between a filled cholesteric layer 11 and the substrate 10 without directly contacting the layer 11 to substrate 10 as layer 12 is a film separating substrate 10 and layer 11. Typical embodiments of such a film 12 would be saran, Teflon, polyethylene, polyvinyl alcohol and clear plastics. Another arrangement possible for FIG. 2 is using an unfilled cholesteric material 11 when the substrate 10 is a dark article which of its own accord will bring out the color patterns of the cholesteric material 11. Again layer 12 is a film separating layer 11 and substrate 10 so that a direct contact between the substrate 10 and the cholesteric layer 11 is avoided while still maintaining a thermally responsive contact.

Where an unfilled cholesteric substance is used (a cholesteric medium in which no finely divided, dark opaque filler has been added) and the substrate 10 is a light colored article, FIG. 3 shows the substrate 10 in thermally responsive contact with an unfilled cholesteric layer 11 with a film of a dark, opaque material, layer 13, being interposed between layer 12, a film, and the substrate 10. The film 12 can be similar to the group set forth for FIG. 2, while the dark opaque film would typically be a black krylon paint layer or a black carbon filled polymeric film.

Figure 4:
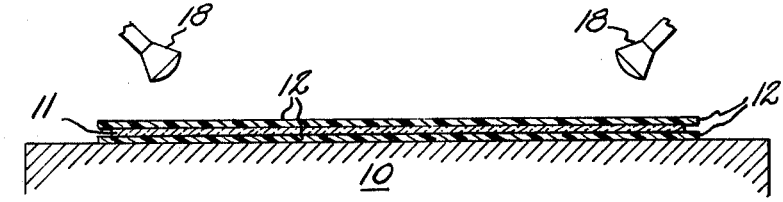

A further embodiment is shown in FIG. 4 in which a substrate 10 is in thermally responsive contact with the filled cholesteric medium layer 11 which layer 11 is surrounded by two layers of film 12 typically selected of the materials used for layer 12 in FIG. 2. Another arrangement possible for FIG. 4 is using an unfilled cholesteric material 11 when the substrate 10 is a dark article which of its own accord will bring out the color patterns of the cholesteric material layer 11. Again the thermally responsive contact is maintained between substrate 10 and the cholesteric layer 11 while layer 11 is surrounded by two layers of film 12 typically selected of the materials used for layer 12 in FIG. 2. It is also possible to have the layer 12 in contact with substrate 10 constituted of a dark opaque layer when using an unfilled cholesteric medium on a light substrate 10.

Figure 5:
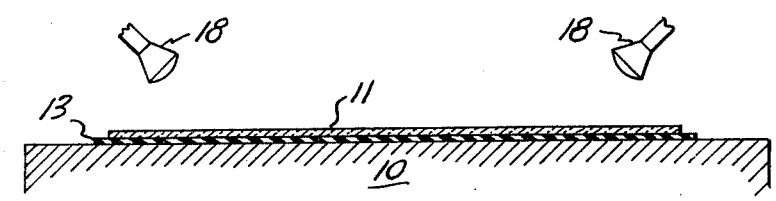

In FIG. 5 the substrate 10 is in thermally responsive contact with an unfilled cholesteric material 11 with a dark opaque film (layer) 13 interposed therebetween with a similar composition for film (layer) 13 as set forth for layer 13 of FIG. 3. FIGS. 1 through 5 have a schematic representation of a heat source 18 which is not critical to the practice of the invention but could be any means suitable of convectively and/or radiatively and/or conductively heating the configurations shown in FIGS. 1 through 5. Typical heat sources would be heat lamps, circulating fluids, enclosed heating ovens, electrical resistance setups and a device for impingement of hot air currents.

It is possible to apply the layers of FIGS. 1 through 5 manually as by merely stretching the clear and/or dark opaque films and subsequently painting or pouring on the cholesteric medium.

After a thermally responsive contact has been achieved between the cholesteric medium and the article to be tested, application of heat is commenced by any of the means set forth above so that the temperature of the article 10 and the cholesteric media 11 are heated to at least a first color transition for the chloesteric medium. At this point it should be noted that any discontinuities in the substrate 10 will have different thermally responsive characteristics being shown in the cholesteric layer 11 so that the discontinuities will be defined by a color discontinuity within the cholesteric layer 11. Heating can further be conducted until a multiplicity of color transitions takes place within the cholesteric layer at the point of the discontinuity in the substrate (that is, depending on the composition of the liquid crystal mixture being employed, the color changes will normally be from clear to red to yellow to green to blue on heating and vice versa on cooling).

It is also possible to record the thermal patterns which develop by means of motion pictures, sketches, etc. Such recordings can be used to very accurately form overlays on the part and precisely located the exact configuration of the discontinuity detected.

Figure 6:
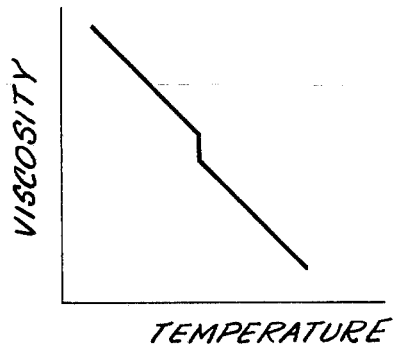
FIG. 6 shows a graph of viscosity versus temperature for a liquid crystal material.

As an additional method of detecting thermal anomalies, I have employed a technique by which permanent indications may be obtained in the cholesteric film over the area with the flaw(s). This is accomplished by carefully heating the liquid crystal layer until the cholesteric-isotopic transiiton temperature is reached. FIG. 6 shows a typical cholesteric-isotropic transition temperature which occurs several degrees above the normal light scattering temperature interval of the cholesteric layer; this is seen as a discontinuity in the graph of viscosity versus temperature. At this point (the cholesteric-isotropic transition temperature) the appearnace of a light blue film is produced due to the Rayleigh scattering by the homeotropic state of liquid crystals. The faster heating rate of a metal surface over a void in a bonded structure, for example, will cause the liquid crystal layer in the area over the void to reach the homeotropic state prior to the adjacent well-bonded areas without voids. At the cholesteric-isotropic transition point, there is a marked decrease in the viscosity of the cholesteric materials which results in a distinctive change in the appearance of the areas of a cholesteric film which have reached this temperature. To preserve flaw indications, the cholesteric film is heated until it reaches the cholesteric-isotropic temperature over the flaw. At this point heating is stopped and the layer and substrate are cooled normally (air cooling). The flaw is then permanently outlined by the intensified light scattering and smooth surface appearance of the liquid crystals adjacent the flow.

When liquid crystal materials have been left on the surface for some time, thus being exposed to the air, the colors may appear rather dull. Such a condition may develop also after repeated cycles of heating the liquid crystal materials. Intensity of the colors may be restored by warming the surface to a temperature where at least one color change occurs and brushing the crystals lightly so as to result in agitation of the crystals on the layers. Although the order of color changes are not altered by this process, the brillance of the colors is restored and enhanced by this technique.

Methods of detecting cracks in substrate have been devised using liquid crystal nondestructive testing techniques. A sample, such as a maraged steel with a weld, had a number of very tight, invisible surface cracks which were successfully detected. The cracks in this material are difficult to detect visually due to the grinding marks in the weld area. I applied a thin film of a penetrating fluid such as aliphatic oils of $C_xH_{2x+2}$ where $x$ varies from 5 to 30, commercial penetrants (e.g. Magnaflux, aliphatic oils with volatile components, 10 weight motor oil, 20 weight motor oil, and kerosene), to the weld region of the part and left it on the weld for sufficient time to enable seepage into the cracks. The part was then wiped clean (i.e., the excess fluid was removed) and filled cholesteric liquid crystals were painted on the part covering the region of the weld followed by heating sufficient to produce at least a first color transition in the liquid crystal layer. The fluid is still left in the cracks and seeps from the cracks during heating. The fluid mixes with the cholesteric material and lowers the color transition behavior of the liquid crystal layer over the cracks with a resutling earlier color change over the crack areas. As a result, the cracks in the weld area of the part are defined first by the distinctly different colors of the contaminated liquid crystal layer (i.e., the area where the kerosene mixes with the liquid crystal layer). Following location of the crack with this technique, a small point heat source could be used to reveal the depth and/or width of the crack by observing the perturbation of the heat flow pattern away from the crack.

A modification of the foregoing method is possible where a highly volatile penetrating fluid such as carbon tetrachloride, hexane, benzene or acetone has been employed. A thin film of the penetrating fluid is applied to the area to be tested for the cracks. The volatile fluid will soon evaporate from the surface areas but not from the cracks. Then the thin film of cholesteric liquid crystals is applied on the part in the areas to be tested for cracks followed by heating sufficiently to produce at least a first color transition in the liquid crystal layer. The penetrating fluid is still left in the cracks and seeps from the cracks during heating. The penetrating fluid mixes with the liquid crystal layer lowering the color transition behavior of the liquid crystal layer over the cracks with a resulting earlier color change over the crack areas. Thus, the cracks in the weld area of the part are defined first by the distinctly different colors of the contaminated liquid crystal layer (i.e., the area where the penetrating fluid mixes with the liquid crystal layer). Following location of the crack with this technique, a small point heat source could be used to reveal the depth and/or width of the crack by observing the perturbation of the heat flow pattern away from the crack.

The following discussion of the applications of liquid crystal media in nondestructive testing with the use of thermal cycling is meant to be representative of the applications which the practice of the above methods set forth in this invention have contributed to the state of the art. It is recognized that people skilled in the art of nondestructive testing will recognize further applications and utilizations of the methods set forth in the instant invention. For this discussion, the transition temperature of the cholesteric material can be conveniently selected from the 20° C. to 60° C. range given above as test conditions demand.

I have used liquid crystal media with thermal cycling to obtain visualization of voids in adhesively bonded aluminum stiffener panels. A mixture of cholesteric derivatives was applied as a layer to the stiffener panel over a light coat of black paint which was necessary in order to observe the light scattering in the unfilled liquid crystal media. Heating of the assembly was then conducted until color changes occurred. Due to the poor heat conduction through regions of the bond containing voids in the stiffener panels, the surface temperature over these areas will rise more rapidly. Therefore, the same amount of heat input will more quickly raise the surface temperature over the voids. The tests run upon these panels outlined the void areas when the panel with its thermally responsive cholesteric layer was heated to the temperature of at least the first color change in the cholesteric material. The phenomenon observed was that the cholesteric layer changed color first in the region of the void, thus physically outlining the region with the void by a change in color.

Fiber glass panels have been tested for delaminations below the surfaces of the panel. Where dark brown fiber glass panels have been employed, the clear liquid crystal media can be applied directly to the upper surfaces without a dark opaque background paint. Further, when the liquid crystal media is filled with a finely divided powder, the liquid crystal media can be applied directly to the fiber glass panel regardless of the color of the panel. For this test, heat was applied from below the fiber glass panel by moving the fiber glass over a linear heat source at a uniform rate. The area over the delamination will be cooler as the heat cannot diffuse through the delamination as readily as it can diffuse through the solid fiber glass material. If this panel is heated to a uniform temperature and then cooled, preferably from the bottom of the panel, the color pattern is reversed (that is, the blue color of the cholesteric material is the starting point for a color change to the various other colors) and the area over the delamination remains warmer than the remainder of the panel. The test very accurately defined the areas of delamination by contrasting colors achieved through the foregoing technique.

Liquid crystal media may aslo be used to monitor the temperature distribution on electronic components while they are operating. For example, five 500 ohm ($\Omega$) $\pm 1\%$ resistors connected in parallel with approximately ten volts potential were coated with a cholesteric medium. It was found that the temperature variation in these five electronic components caused considerable variation in color ranging from a colorless indication through red through yellow to green on various areas of the components. Although no particular significance can be attached to temperature profiles in general for resistors, it has been suggested that resistors having nonuniform temperature distributions may have shorter life expectancy because of impaired heat dissipation From the foregoing, it can be seen that liquid crystals painted on the surface of operating electronic components represent a simple means of monitoring the temperature distribution in active circuits.

Another application of interest in electronic technology is the detection of high resistance connections or shorted connections. A portion of a multilayer circuit board in which the circuit interconnectors join together conductive strips was coated with a cholesteric medium. By passing current through these circuits and observing the sequence of color changes of the cholesteric medium on the board, it was possible to quickly select connectors having resistance above average for the particular board tested. The hot connections were easily detected because they quickly produced a color change in the clear cholesteric media. Since heating is directly proportional to the resistance of the component, defective components or defective connections for such components can be easily detected in such assemblies by use of the methods of the instant invention.

A discontinuity such as a surface crack may impede the flow of heat sufficiently to produce an appreciable distortion in the normal temperature pattern emanating from a point source of heat. This was tested on a beryllium clip containing a fine crack greatly exaggerated as shown in FIG. 7. The clip 22 was coated on its surface with a cholesteric media 23 and heated near one edge of the clip 22 with a point source of heat 24. When the heat flow reached the crack 25 in the clip 22, a definite buildup in the temperature on the side near the heat source 24 occurred and a correspondingly low temperature region on the far side of the crack could be observed. FIG. 7 shows a typical buildup of heat around crack 25 with the various color regions being labeled. Similar results were obtained with a maraged steel weld which contained a number of very tight cracks difficult to detect visually but which were outlined quite readily by this method. Some gross subsurface flaws have also been detected by this technique. A void located close to the surface of a weld, for example, will produce a transient "hot spot" in the color pattern of a cholesteric medium as the surface is heated. The reduced mass of material over the void results in the local excess temperature until the lateral heat flow produces a uniform surface temperature.

Liquid crystal materials have also been used to inspect a number of different types of honeycomb sandwich materials. Many imperfections in the honeycomb sandwich materials can be easily detected through the use of liquid crystalline materials because the regular temperature pattern outlines will be varied due to such imperfections.

To determine if the tapered portion of an aluminum rivet was properly isolated from an aluminum skin section in which it was inserted, a mixture of liquid crystals with a color transition temperature of around 30° C. was applied to the head of the rivet. The rivet was heated by a solder pencil placed on the center of the same side of the rivet. Rivets properly coated with zinc chromate heated rapidly due to their thermal isolation, and in approximately two seconds the entire head of the rivet produced a violet color in the liquid crystal layer. Uninsulated rivets lost heat rapidly through their contact with the skin material to which they were attached and required 20 seconds or longer to bring the color of the cholesteric medium on the rivet to a violet color.

Liquid crystals, particularly with filler added, provide a rapid and very sensitive means of mapping human skin temperatures. These darkened cholesteric materials are especially useful for applications where movement of the skin, as around joints, normally causes cracking of underlying black background paint. Several studies have been conducted in a variety of medical fields. Pediatricians are evaluating these materials as remote temperature indicators on infants in incubators. In a normal infant, the feet should be about 1° C. below the abdomen temperature. By placing liquid crystal layers with appropriate color transition temperatures on both of these areas of the infant, the respective temperatures of each area are quickly indicated. If the relative temperature differences increase beyond this, it may be an indication of an infectious disease causing vasoconstriction. If the relative temperatures are less than a degree apart, the incubator may be too warm.

The temperature indications provided by the cholesteric materials reflect when vein graphs have successfully restored circulation to the extremities. The successful removal of arterial blockage is also reflected by the increase in temperature over arteries lying close to the skin. If the temperature rise does not occur, it is likely that the blood vessel has not been completely opened. The efficiency of vascular activity at sutures, skin flaps, and wounds after surgery may also be indicated by skin temperature patterns. A plastic surgeon is evaluating this as a means of reducing the waiting time before commencing second stage constructive surgery.

The damage to blood vessels in the areas of second and third degree burns may produce localized temperature anomalies visible by liquid crystal media placed on the area of the damage. To prevent infection in the area of severe burns, the common practice is to apply silver nitrate to the area. This darkens the skin and makes visual examination of the burned tissue difficult. With layers of cholesteric materials applied to small controlled areas of third degree burns on laboratory animals, I have accurately outlined the extent of severe burning due to an appreciably lower temperature indication over these areas. This would enable early removal of the tissue in the third degree burn areas and allow grafting to commence shortly afterwards.

Voids, lack of adhesion, improper adhesive splices, crushed cores and nonuniform filleting in adhesively bonded metallic and nonmetallic structures have been detected by thermally heating a layer of liquid crystal material in a thermally sensitive contact with the parts having the foregoing imperfections. The foregoing tests are conducted by rapidly heating and cooling one surface of the composite structure when the structure has face sheets of approximately 0.030" or less. With thicker materials, greater sensitivity can be obtained by heating one surface while cooling the opposite side and viewing the temperature patterns produced by the gradient across the bond line. Further application of this technique was made upon brazed and diffusion bonded metallic structures with similar successful results.

Media of liquid crystals in thermally sensitive contact with aluminum alloys have been used to view the thermal effects associated with a number of metallurgical phenomena. For example, it has been possible to directly visualize very rapid and localized temperature pulses associated with plastic instabilities during hyper-yield straining of aluminum alloys. This technique has enabled direct visualization of the temperature effects of Lüder line formation in aluminum alloys. Localized heating of 8-1-1 titanium undergoing fatigue cycling has also been seen in this manner in the areas of fatigue crack nucleation.

A coolant panel to be used with the Apollo space capsule was tested by cycling hot water through the fluid channels while observing the surface temperature pattern caused on the panel as reflected in a liquid crystalline medium having a thermally sensitive contact with the surface of the panel. Channels in which water flow was restricted were delineated on the panel surface by their tendency to heat and cool more slowly than the unrestricted channels. Similar techniques should be used to test for clogging in fluid flow channels of any similar part.

The many advantages of the instant invention will be readily utilized by any laboratory, hospital, assembly line or other establishments doing nondestructive testing applications, thermal measurements over a surface area or other heat sensitive applications. No expensive initial investment is necessary to use the methods of the instant invention. As testing temperatures vary, the selection of the cholesteric medium can be varied to give precise, corresponding color transition temperatures. The testing techniques are adaptable to bodies with large, irregular surface areas as well as conventional shapes. Further, the testing techniques are readily understood and conducted by production personnel.

While I have described and illustrated some preferred methods of my invention, it should be understood that many modifications may be made without departing from the spirit and the scope of the invention, and it should therefore be understood that the invention is limited only by the scope of the appended claims.

I claim:
1. A method of determining discontinuities in an area of a substrate so as to achieve a permanent indication of the discontinuities comprising the steps of:
(a) applying a layer of liquid crystal medium in thermally responsive contact with the area of said substrate, said medium possessing the property of an abrupt decrease in viscosity at a cholesteric isotropic transition temperature above the range of selective light scattering;
(b) heating said area by an amount sufficient to bring the cholesteric medium adjacent the discontinuities to the cholesteric-isotropic transition temperature, whereby the surface texture of said medium adjacent the discontinuities alters as the medium abruptly decreases in viscosity and
(c) cooling the area to a temperature below the isotropic-cholesteric transition temperature to preserve the altered surface texture of the medium adjacent the discontinuities and providing a permanent indication of the discontinuities.

2. A method of restoring the selective light scattering properties of a cholesteric liquid crystal medium on a substrate after the cholesteric liquid crystal medium has been thermally cycled for some time or has been on the substrate for some time, said cholesteric liquid crystal medium normally possessing the property of selective light scattering at a characteristic temperature range, comprising the steps of
(a) warming the substrate and the cholesteric liquid crystal medium to the characteristic temperature range to produce at least one change in color by selective light scattering and
(b) agitating the liquid crystal medium.

3. The method as claimed in claim 2 or 1 wherein the cholesteric liquid crystal medium comprises:
(a) a first component of cholesteryl oleate;
(b) a second component selected from the group consisting of cholesteryl nonanoate, cholesteryl decanoate, cholesteryl octanoate, and cholesteryl paranitrobenzoate; and
(c) a third component selected from the group consisting of cholesteryl acetate and cholesteryl propionate.

References Cited

UNITED STATES PATENTS

| | | | |
|---|---|---|---|
| 2,128,228 | 8/1938 | Betz et al. | 73—15 |
| 2,260,186 | 10/1941 | McNutt | 73—15 |
| 3,034,334 | 5/1962 | DeForest | 73—15.4 |
| 2,959,471 | 11/1960 | Morgia | 23—230 |
| 3,114,039 | 12/1963 | Switzer | 250—71 |

FOREIGN PATENTS

| | | |
|---|---|---|
| 890,877 | 9/1953 | Austria. |
| 703,227 | 2/1965 | Canada. |

OTHER REFERENCES

Pages 1209–1219, vol. 25, No. 7, Journal Organic Chem., "Preparation and Certain Physical Properties of Some Plant Sterylesters," by A. Kukiss and J. M. R. Beveridge, July 1960.

"Liquid Crystals," by James L. Fergason, Scientific American, August 1964, pp. 76–85.

RICHARD C. QUEISSER, Primary Examiner

J. J. WHALEN, Assistant Examiner

U.S. Cl. X.R.

73—15